_United States Patent_ [19]

Kolling et al.

[11] 4,059,720

[45] Nov. 22, 1977

[54] PROCESS FOR THE PRODUCTION OF POLYETHYLENE HAVING MOLECULAR WEIGHTS ABOVE 500,000

[75] Inventors: Helmut Kolling; Friedrich Rappen; Nikolaus Geiser, all of Oberhausen, Germany

[73] Assignee: Ruhrchemie Aktiengesellschaft, Oberhausen-Holten, Germany

[21] Appl. No.: 672,140

[22] Filed: Mar. 31, 1976

Related U.S. Application Data

[63] Continuation of Ser. No. 528,737, Dec. 2, 1974, abandoned.

[30] Foreign Application Priority Data

Dec. 11, 1973  Germany ........................... 2361508

[51] Int. Cl.² .......................... C08F 4/66; C08F 10/02
[52] U.S. Cl. .................................... 526/74; 526/138; 526/142; 526/352
[58] Field of Search ................... 526/74, 77, 138, 142

[56] References Cited

U.S. PATENT DOCUMENTS 3,161,628  12/1964  Dost et al. .......................... 526/142

FOREIGN PATENT DOCUMENTS 1,111,493  4/1968  United Kingdom
844,864  8/1960  United Kingdom
862,429  3/1961  United Kingdom _Primary Examiner_—Edward J. Smith
_Attorney, Agent, or Firm_—Bierman & Bierman

[57] ABSTRACT

A process is described wherein polyethylenes having molecular weights greater than 500,000 are prepared and in which the formation of polymer film and lumps in the polymerization reactor is virtually eliminated. The process comprises polymerizing ethylene in the presence of a solvent, a titanium (III) halide/aluminum alkyl catalyst and a mono-or polyhydric alcohol, the ethylene having an oxygen content of less than 5 ppm.

4 Claims, No Drawings

PROCESS FOR THE PRODUCTION OF POLYETHYLENE HAVING MOLECULAR WEIGHTS ABOVE 500,000

This application is a Rule 60 Continuation of parent application Ser. No. 528,737 filed on Dec. 2nd, 1974, now abandoned, and claims the priority of German application P 23 61 508.9 filed on Dec. 11th, 1973.

It is known to polymerize ethylene at pressures below about 100 kgs./sq.cm.g. and at temperatures up to about 100° C. using as catalysts mixtures of organometallic compounds, especially aluminum alkyl compounds and/or aluminum haloalkyl compounds of metals of subgroups IV to VI of the Periodic Table, especially with titanium compounds (cf. Angewandte Chemie, 67, 1955, pp. 541–547, and Belgian Pat. Nos. 533,362 and 534,792). The polymerization is generally carried out in the presence of an inert liquid solvent in which the polyethylene produced is suspended. In most cases, hydrocarbon fractions in the gasoline or diesel oil boiling range are used as the suspending liquid.

In this process, the level of the molecular weight of the polyethylenes can be varied, for example by varying the molar ratio of aluminum alkyl compounds and titanium compounds, the molecular weight increasing as the proportion of the aluminum alkyl compound is increased.

The ethylene-containing gas used for the polymerization must be substantially free of contaminants such as moisture, acetylene, carbon monoxide or sulfur compounds. However, extreme removal of oxygen has been found to be not advantageous. Addition of small amounts of oxygen, e.g., in amounts of 0.005 to 0.05% by volume, based on the volume of ethylene, improves the conversion of ethylene while complete removal results in poor yields (German Pat. No. 1,268,847).

It is known from German Pat. No. 1,195,496 that alcohol can be added in addition to oxygen when polymerizing ethylene, for controlling molecular weight. In this case, the amount of oxygen added is balanced with the amount of alcohol added such that the oxygen is increased to the extent to which alcohol is decreased. The addition of alcohol adjusts the molecular weight of the polyethylene to the level desired, the molecular weight of the polyethylene produced being in inverse proportion to the amount of alcohol added.

The presence of alcohol is essential when operating the polymerization on a commercial scale, especially for continuous operation, because it prevents the undesirable formation of film and lumps in the reactor. Hence, fouling and plugging of the outlet lines is avoided. In prior art processes, such fouling required plant shutdown after only a few days of operation. On the other hand, the addition of alcohol permits continuous polymerization to be carried out for many weeks and months without shutdown and permits control of the molecular weight in such a manner that it can be maintained constant within narrow limits.

German Pat. No. 1,195,496 is directed to the preferential formation of polymers having viscosimetrically determined molecular weights of between about 500,000 to 50,000, it having been observed that the seriousness of film formation increases as the molecular weight of the polyethylene decreases. Therefore, it was presumed that polyethylenes having molecular weights in excess of about 500,000 could be produced without appreciable film formation being encountered.

However, it has now been found when producing polyethylene of very high molecular weight with the use of Ziegler catalysts comprising organoaluminum compounds and titanium-III halides, if alcohol and oxygen are added to the polymerization, the presence of even the smallest amounts of oxygen results in interference in the polymerization process by serious formation of film and lumps. If the ethylene contains more than 5 ppm of oxygen, difficulties are encountered from the formation of film, sintering and deposits in both batchwise and continuous polymerization. It is not possible in most cases in continuous operation to carry out the polymerization for more than only a few days without interruptions.

Therefore, it is an object of the invention to provide a process which permits the production of high molecular weight polyethylenes with addition of alcohol without encountering the above-mentioned disadvantages. This object is surprisingly achieved by the process of the present invention.

The invention consists of a process for the production of polyethylene having a molecular weight above 500,000 at temperatures of 30° to 130° C. and pressures of 1 to 100 kgs./sq.cm.g. with the use of Ziegler catalysts which contain titanium-III halides and organoaluminum compounds.

The process is characterized in that:

a. the catalysts comprise titanium-III halide and organoaluminum compounds in a molar ratio of 1:0.2 to 1:5, the titanium-III halide having been prepared separately, b. the ethylene used has an oxygen content of less than 5 ppm., and c. alcohol in amounts of 2 to 10 moles per kg. of catalyst, is added during the polymerization.

Preferably, the molar ratio of titanium-III halides to the organoaluminum compounds is 1:0.5 to 1:1.5.

The polymerization can be carried out for longer times with less plant shutdown, the lower the oxygen content of the ethylene. When using ethylene having an oxygen content of less than 1 ppm. it is possible to continue operating the polymerization process for several months without any difficulties.

Monohydric or polyhydric aliphatic alcohols are added to the reaction mixture. Preferred are alcohols having 2 to 5 carbon atoms. Butanol has been found to be particularly advantageous.

The process according to the invention is desirably carried out in the presence of hydrocarbons boilingg within the range of 80 to 200° C. and having preferably been purified by hydrogenation before being used.

Aluminum alkyl compounds in the sense of the present invention are compounds of the general formulas $AlR_3$, wherein R represents alkyl residues having 2 to 10 carbon atoms, and $Al \, X \, R'_2$, wherein R' represents alkyl residues having 2 to 10 carbon atoms and X represents halogen atoms, especially chlorine.

According to the invention aluminum alkyl compounds are to be used for the reduction of the Ti (IV) halogen compounds to the corresponding Ti (III) halogen compounds.

To secure that the oxygen content in the polymerization system does not exceed the maximum value of 5 ppm, the whole system prior to starting is being rinsed with ethylene poor in oxygen, and the gasoline fraction used as solvent is being screened off against access of oxygen by addition of nitrogen.

The following examples illustrate the nature of the invention. The reaction pressures in examples 1 and 2 were one (1) kgs./sq.cm., in example 3 five (5) kgs./sq.cm.

EXAMPLE 1

A reactor having a capacity of 5 liters and provided with a stirrer, a gas inlet and outlet line, a thermowell, a nozzle for introducing catalyst and a cooler was used for the batchwise polymerization of ethylene. 2 liters of a petroleum-derived hydrocarbon fraction boiling between 130° and 180° C were charged into the reactor. This solvent had previously been purified by hydrogenation over a nickel catalyst.

The gas used for the polymerization and an ethylene content of 99.95%. The impurities such as acetylene, carbon monoxide, carbon dioxide, sulfur compounds and aater totaled 8 ppm. The oxygen content was <1 ppm.

The titanium trichloride used as one catalyst component was prepared as follows:

Into a stirring vessel having a capacity of about 1 liter were introduced under a protective nitrogen atmosphere 31.6 g. of diethyl aluminum monochloride and 25,0 g. of titanium tetrachloride in 0.5 liters of the same gasoline fraction which was charged into the polymerization reactor. The molar ratio of titanium tetrachloride to diethyl aluminum monochloride was 1:2. The mixture was then stirred for 1 hour at room temperature. The titanium trichloride which was insoluble in the hydrocarbon was removed by filtration and washed several times with the highly purified gasoline fraction. Thereafter, sufficient gasoline to reach the original volume was added.

To prepare the catalyst used for the polymerization, the titanium trichloride which was insoluble in gasoline was suspended by stirring whereupon 9.5 g. of diethyl aluminum monochloride were added. The molar ratio of titanium trichloride to diethyl aluminum monochloride was 1:0.6.

The batchwise polymerization was carried out at a temperature of 80° C. After addition of 2.0 g. of the catalyst described above, 0.8 ml. of butanol were added. The conversion of ethylene was substantially completed after a reaction period of 5 hours. Polyethylene having a molecular weight of about 1,300,000 determined viscosimetrically had been produced in an amount of 685 g. The stirrer and the walls of the polymerization vessel were free from any formation of film and deposits.

EXAMPLE 2

Batchwise polymerization of ethylene was carried out as described in Example 1 except that an ethylene gas containing 10 ppm. of oxygen was used. After a reaction period of 5 hours, 569 g. of polyethylene having a viscosimetrically determined molecular weight of about 1,100,000 had been produced. Upon termination of the experiment, the polymerization vessel showed film deposits on all nozzles and on the stirrer, which, when continuing the polymerization, would lead to serious hindrance or shutdown of the polymerization.

EXAMPLE 3

Ethylene was continuously polymerized in a glass-lined reactor having a capacity of about 14 cu.m. and provided with a water jacket for temperature control, a stirrer, a gas inlet and outlet line, a thermowell, a nozzle for introducing the catalyst, and an outlet line through which part of the reaction mixture was withdrawn continuously. The reactor was filled with 14 cu.m. of a petroleum-derived hydrocarbon fraction boiling between 130° and 180° C. and having previously been purified by hydrogenation over a nickel catalyst.

The gas used for the polymerization had an ethylene content of 99.95%. The impurities such as acetylene, carbon monoxide, carbon dioxide, sulfur compounds and water totalled 8 ppm. The oxygen content was lower than 1 ppm.

The catalyst used had been prepared as follows:

Into an 800 liter stirring vessel were introduced, under nitrogen, 31.6 kgs. diethyl aluminum monochloride dissolved in 500 liters of the same gasoline fraction used for the polymerization. Thereafter, a solution of 25 kgs. of titanium tetrachloride in 100 liters of gasoline was added within 4 hours at 20° to 22° C. The molar ratio of titanium tetrachloride to diethyl aluminum monochloride was 1:2. This was followed by maturation or aging for 8 hours at 20°-22° C. while stirring, whereupon the stirrer was stopped and the catalyst solution allowed to stand for further 12 hours. The supernatant mother liquor above the settled titanium trichloride was then removed by thorough siphoning and the titanium trichloride was washed twice with gasoline. Thereafter the titanium trichloride was diluted with 500 liters of gasoline and forced by means of nitrogen into a catalyst storage vessel of about 3,000 liters capacity. Then 9.5 kgs. of diethyl aluminum monochloride were added and the storage container was filled up with gasoline to 3,000 liters. The catalyst mixture contained 10 g. of catalyst per liter of solution. The molar ratio of titanium trichloride to diethyl aluminum monochloride was 1:0.6.

The polymerization was carried out at a temperature of 80° C. The catalyst prepared as described above was continuously introduced into the reactor at a rate of 300 g./hr. Moreover, 100 ml./hr. of butanol were added to the reactor. The amount of ethylene absorbed was about 250 cu. m./hr. on an average. Reaction product was continuously withdrawn from the reactor and separated into polyethylene and auxiliary liquid in a filter unit downstream of the reactor. The auxiliary liquid was recycled into the polymerization reactor. In a subsequent deashing operation, the polyethylene was freed from gasoline still adhering thereto and from catalyst residues. After drying there was obtained a white powder, the viscosimetrically determined molecular weight of which constantly ranged between 1,000,000 and 1,200,000 over months. Difficulties due to formation of film or lumps in the reactor were not encountered even after an operating period of many months.

What is claimed is:

1. A process for preparing polyethylene having a viscosimetrically determined molecular weight greater than about 500,000, said process comprising the steps of:
   A. Reducing a titanium (IV) halide with an aluminum alkyl compound of the formula $AlR_3$ or $AlXR_2$, wherein R is an alkyl radical having 2 to 10 carbon atoms and X is halogen whereby an activated titanium (III) halide is formed, and
   B. Polymerizing ethylene having an oxygen content of less than 1 ppm. in the presence of
      a. a hydrocarbon solvent having a boiling point in the range of 80° C. – 200° C., said solvent having been pre-purified by hydrogenation,
      b. a catalyst comprising said activated titanium (III) halide and an aluminum alkyl compound, in a respective molar ratio of 1:0.2 to 1:5, said aluminum compound being of the formula $AlR_3$ or $AlXR_2$, wherein R is an alkyl radical having 2 to 10 carbon atoms and X is halogen, and c. a mono - or polyhydric alcohol having 2 – 5 carbon atoms in an amount of 2 to 10 moles per kg. of catalyst; said polymerizing being conducted at a pressure of 1 to 100 atmospheres at a temperature of 30° C. to 100° C.

2. The process of claim 1 wherein X is chlorine.

3. The process of claim 1 in which the molar ratio is 1:05 to 1:1.5.

4. The process of claim 1 in which the alcohol is butanol.

* * * * *